United States Patent [19]

Kawamura et al.

[11] Patent Number: 4,684,861
[45] Date of Patent: Aug. 4, 1987

[54] INTERFACE UNIT BETWEEN A NUMERICAL CONTROLLER AND AN ELECTRIC POWER CONTROL CIRCUIT

[75] Inventors: Hideaki Kawamura, Hachioji; Toshiaki Otsuki, Hino, both of Japan

[73] Assignee: Fanuc Ltd, Minamitsuru, Japan

[21] Appl. No.: 822,429

[22] PCT Filed: May 1, 1985

[86] PCT No.: PCT/JP85/00251

§ 371 Date: Dec. 20, 1985

§ 102(e) Date: Dec. 20, 1985

[87] PCT Pub. No.: WO85/05199

PCT Pub. Date: Nov. 21, 1985

[30] Foreign Application Priority Data

May 2, 1984 [JP] Japan ................................ 59-88906

[51] Int. Cl.[4] ............................................. G05B 19/00
[52] U.S. Cl. .................................. 318/567; 318/569; 318/632; 364/474
[58] Field of Search ............... 318/632, 567, 569, 600; 364/133, 134, 474

[56] References Cited

U.S. PATENT DOCUMENTS 4,594,670 6/1986 Itoh .................................. 318/632 X

FOREIGN PATENT DOCUMENTS 1314132 4/1973 United Kingdom ................ 318/571

Primary Examiner—Benjamin Dobeck
Attorney, Agent, or Firm—Staas & Halsey

[57] ABSTRACT

An interface unit is connected beween a numerical controller (NC) and an electric power control circuit (PC). The interface unit includes an actual speed memory (50) into which the numerical controller (NC) can write actual speed data and from which the electric power control circuit (PC) can read out the written data, and a corrected speed memory (51) into which the electric power control circuit (PC) can write corrected speed data and from which the numerical controller (NC) can read out the written data. This makes it possible for the electric power control circuit (PC) to detect the actual speed of the numerical controller (NC) by reading out the actual speed memory (50), and to control the actual speed of the numerical controller (NC) by writing the corrected speed data in the corrected speed memory (51).

1 Claim, 5 Drawing Figures

INTERFACE UNIT BETWEEN A NUMERICAL CONTROLLER AND AN ELECTRIC POWER CONTROL CIRCUIT

BACKGROUND OF THE INVENTION

The present invention relates to an interface unit between a numerical controller and an electric power control circuit.

A numerical controller NC and a machine tool TM are usually interconnected via an electric power control circuit, commonly referred to as a PC.

FIG. 1 illustrates the general arrangement of a conventional numerically controlled machine tool. Reference numeral 1 indicates a microcomputer for numerical control, 2 its bus, 3 a tape reader for converting information punched in a command tape 4 into an electric signal, 5 a manual data input device (MDI) provided with numeric keys and character keys 6, a CRT for displaying the contents of an NC command program or the like, 7 a ROM for storing a system program or the like, 8 a RAM for operations, 9 a nonvolatile memory for storing the NC command program or the like (e.g., a magnetic bubble memory), 10 to 12 X-, Y- and Z-axis control circuits for driving X- , Y- and Z-axis motors 40 to 42 provided in the machine tool, 13 a buffer, 14 a driver and 15 a receiver. They constitute the numerical controller (NC). Reference numeral 20 designates a microcomputer for electric power control, 21 its bus, 22 a ROM for storing a control program or the like, 23 a RAM for operations, 24 a nonvolatile memory, for example, a magnetic bubble memory, 25 a buffer, 26 a receiver, 27 a driver, 28 a buffer, 29 a receiver and 30 a driver. They make up the electric power control circuit (PC). The numerical controller NC and the electric power control circuit PC are interconnected via the drivers 14 and 27 and the receivers 15 and 16. Data such as a motor start signal, a tool exchange command signal, a tool number and so forth, is delivered from the numerical controller NC to the electric power control circuit PC via the driver 14 and the receiver 26. The electric power control circuit PC responds to the input data to execute predetermined sequence control or the like, causing the machine tool TM to perform starting of the motors, a tool exchange or the like via the driver 30. Information such as the end of the tool exchange or the like is provided from the electric power control circuit PC to the numerical controller via the buffer 25, the driver 27, the receiver 15 and the buffer 13. After recognizing the information, the numerical controller NC performs the next process or the like.

Incidentally, it is sometimes desired to automatically control the actual speed (the cutter speed) from the side of the machine tool in accordance with, for example, a load on the machine tool during cutting, or the amount of cutting chip, so as to achieve higher precision or the like. With the conventional numerically controlled machine tool, however, the actual speed is determined by a speed command value in the NC command program and the override ratio. For changing the actual speed, there is no method but to modify the speed command in the NC command program or to manually change the override ratio, so that it is difficult to effect the above-mentioned control.

SUMMARY OF THE INVENTION

An object of the present invention is to enable the electric power control circuit to refer to and instruct the actual speed of the numerical controller.

To attain the above object, the present invention is provided with an actual speed memory in which the numerical controller can write actual speed data, and from which the electric power control circuit can read out the data; and a corrected speed memory in which the electric power control circuit can write corrected speed data, and from which the numerical controller can read out the data.

DETAILED DESCRIPTION OF THE PREFERRED EMBODIMENTS

Figure 1:
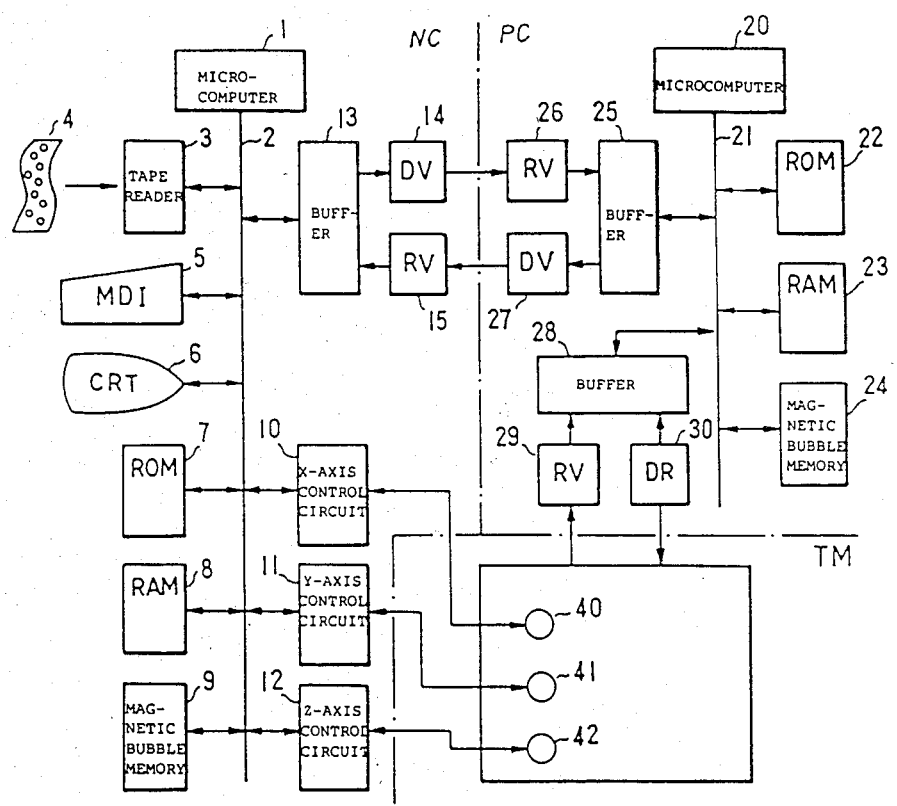
FIG. 1 is a block diagram of the general arrangement of a conventional numerically controlled machine tool.
Figure 2:
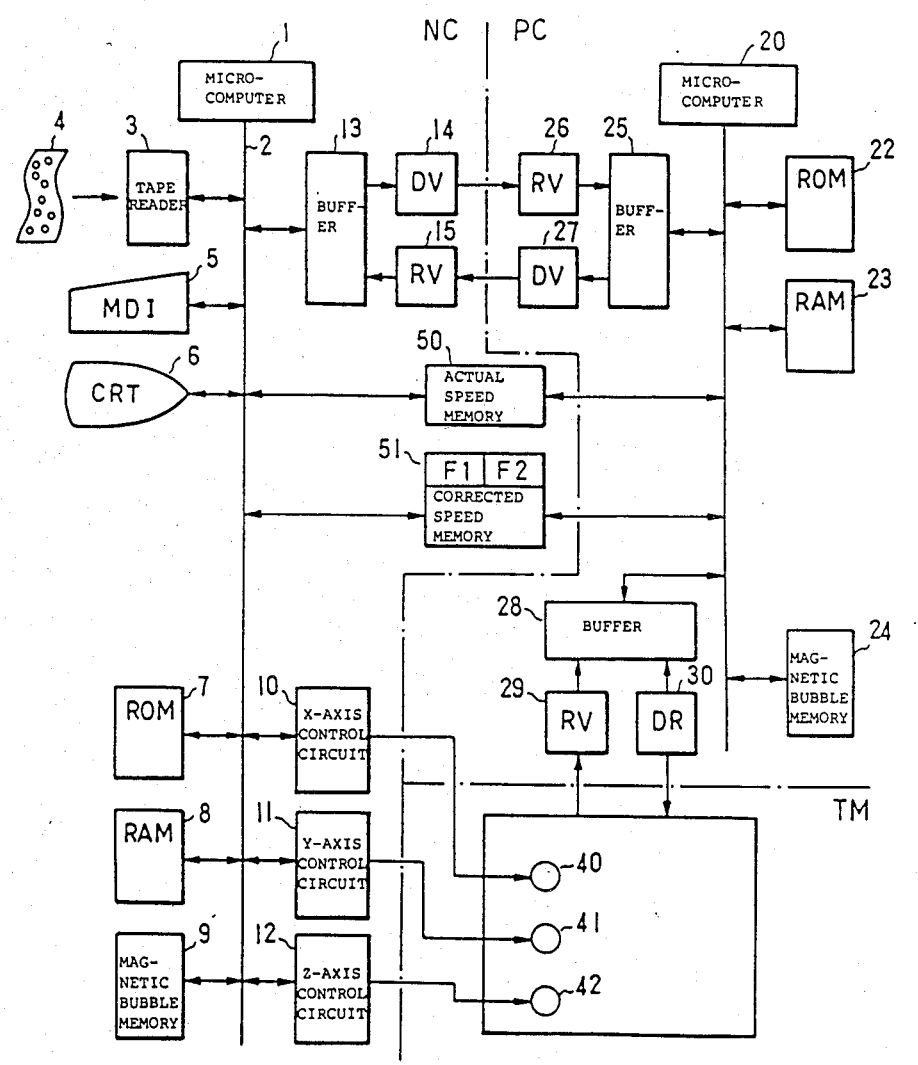
FIG. 2 is a block diagram of the principal part of an example of the hardware arrangement of an embodiment of the present invention.

FIG. 2 illustrates in block form the principal part of an example of the hardware arrangement of an embodiment of the present invention, in which the same reference numerals as those in FIG. 1 indicate the same parts. Reference numeral 50 indicates an actual speed memory, 51 a corrected speed memory, F1 a mode flag and F2 a set flag. The arrangement of the illustrated embodiment differs from the prior art example of FIG. 1 in the provision of an interface unit which is comprised of the actual speed memory 50 into which the numerical controller NC can write actual speed data and from which the electric power control circuit PC can read out the written actual speed data; and the corrected speed memory 51 into which the electric power control circuit PC can write corrected speed data and from which the numerical controller NC can read out the written corrected speed data. With the provision of such an interface unit, the electric power control circuit PC can detect the actual speed of the numerical controller NC by reading out the contents of the actual speed memory 50, making it possible to determine cutting conditions based on the data. Furthermore, since the electric power control circuit PC is capable of controlling the actual speed of the numerical controller NC by writing corrected speed data in the memory 51, it is possible to correct the current actual speed of the numerical controller NC to a suitable value when it is detected, for instance, by reading out the actual speed memory 50, that the actual speed of the numerical controller NC is not proper.

Figure 3:
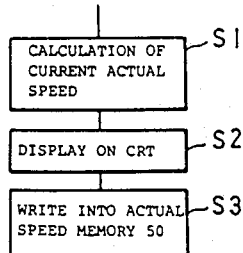
FIGS. 3 and 5 are flowcharts for an example of the processing performed by a microcomputer 1.

FIG. 3 is a flowchart of an actual speed calculation process which is performed by the microcomputer 1. The microcomputer 1 executes, for each predetermined period, conventional processing includes a current actual speed calculation process (S1); and a process for displaying the computed actual speed on the CRT 6; and, in addition, a process (S3) for writing the computed actual speed in the actual speed memory 50.

Figure 4:
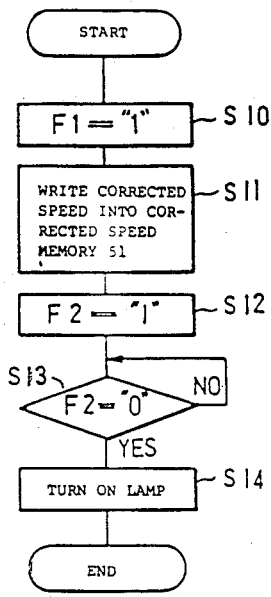
FIG. 4 is a flowchart for an example of the processing performed by a microcomputer 20.

The microcomputer 20 detects the actual speed of the numerical controller by reading out the actual speed memory 50. When the microcomputer 20 corrects the actual speed, it makes the mode flag F1 a "1" (S10) (FIG. 4) and then writes corrected speed data in the memory 51 (S11), thereafter making the set flag F2 a "1" (S12).

Figure 5:
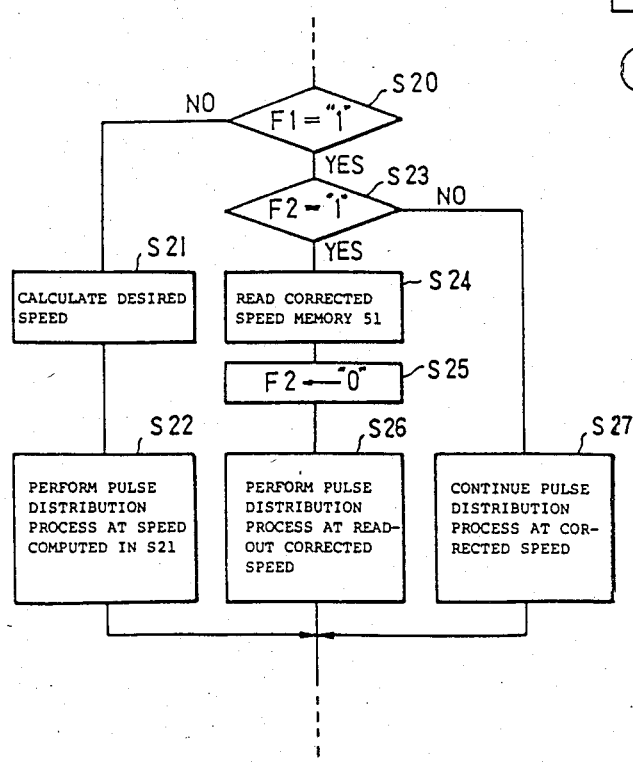

The microcomputer 1 executes, for each predetermined period, such processing as depicted in FIG. 5. When the mode flag F1 is a "0", the microcomputer calculates a speed for use in a pulse interpolation from a speed command value (F) and an override ratio in the NC command program (S21), and performs a pulse distribution process at that speed (S22). In the case where the mode flag F1 goes to a "1", however, when the set flag F2 goes to a "1" (S23), the microcomputer 1 reads out the contents of the corrected speed memory 51 (S24) and makes the set flag F2 a "0" (S25), thereafter causing the pulse interpolation to take place at the corrected speed (S26). When the mode flag F1 is a "1" and the set flag F2 a "0", the pulse distribution is continued at the previously computed corrected speed (S27). Incidentally, when the microcomputer 20 detects in step S13 that the set flag F2 has gone to a "0", it lights a lamp or the like provided, for example, in the machine, for notifying an operator or the like of the completion of the speed correction process (S14). In the case of returning the actual speed to the original value, the microcomputer 20 makes the mode flag F1 a "0" and then turns OFF the above-mentioned lamp. When the mode flag F1 goes to a "0", the microcomputer 1 calculates the speed for use in the interpolation from the speed command value (F) and the override ratio in the NC command program (S21), and executes the pulse distribution process at that speed (S22), as depicted in FIG. 5, thus effecting control at the original speed.

As described above, the present invention is provided with an actual speed memory into which the numerical controller NC can write actual speed data and from which the electric power control circuit PC can read out the written actual speed data, and a corrected speed memory into which the electric power control circuit PC can write corrected speed data and from which the numerical controller NC can read out the written corrected speed data. Therefore, the electric power control circuit PC is capable of detecting the actual speed of the numerical controller NC by reading out the contents of the actual speed memory, making it possible to use the data for determining cutting conditions. Furthermore, the electric power control circuit PC is capable of controlling the actual speed of the numerical controller NC by writing corrected speed data in the corrected speed memory, so that, for example, when it is detected by reading out the actual speed memory that the current actual speed of the numerical controller is inappropriate, a process for correcting the actual speed to a suitable value by writing the corrected speed data can easily be carried out.

What is claimed is:

1. An interface unit for connection between a numerical controller and an electric power control circuit, comprising:
   an actual speed memory, coupled to the numerical controller and the electric power control circuit, into which the numerical controller can write actual speed data and from which the electric power control circuit can read out the written actual speed data; and
   a corrected speed memory, coupled to the numerical controller and the electric power control circuit, into which the electric power control circuit can write corrected speed data and from which the numerical controller can read out the written corrected speed data.

* * * * *

UNITED STATES PATENT AND TRADEMARK OFFICE
CERTIFICATE OF CORRECTION

PATENT NO. : 4,684,861

DATED : Aug. 4, 1987

INVENTOR(S) : Kawamura et al.

It is certified that error appears in the above-identified patent and that said Letters Patent is hereby corrected as shown below:

Col. 1, line 20, change "keys 6," to --keys, 6--.

Signed and Sealed this

Twelfth Day of January, 1988

Attest:

DONALD J. QUIGG

*Attesting Officer*  *Commissioner of Patents and Trademarks*